(No Model.) 2 Sheets—Sheet 1.

G. SYMONS.
CORN PLANTER.

No. 309,894. Patented Dec. 30, 1884.

WITNESSES

George Symons
INVENTOR
by C. A. Snow & Co.
Attorneys (No Model.) 2 Sheets—Sheet 2.
G. SYMONS.
CORN PLANTER.
No. 309,894. Patented Dec. 30, 1884.
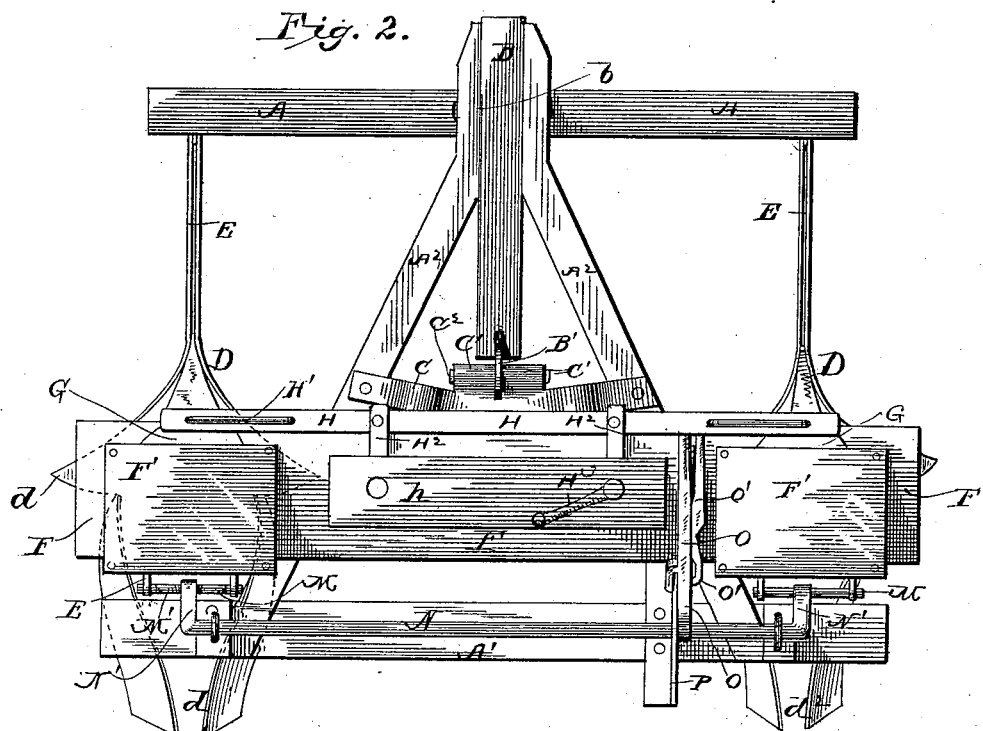
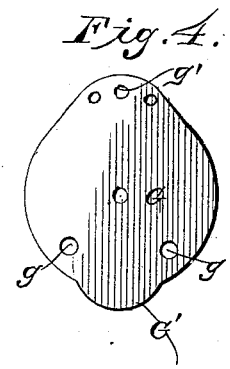
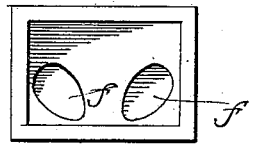
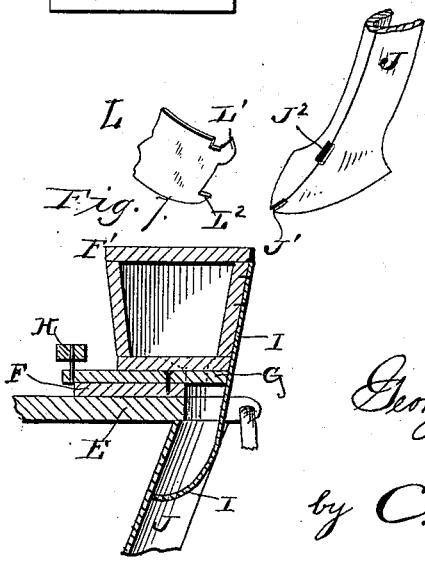
WITNESSES
W. W. Mortimer
E. G. Siggers
George Symons
INVENTOR
by C. A. Snow & Co.
Attorneys

UNITED STATES PATENT OFFICE.

GEORGE SYMONS, OF SHERIDAN, INDIANA.

CORN-PLANTER.

SPECIFICATION forming part of Letters Patent No. 309,894, dated December 30, 1884.

Application filed August 23, 1884. (No model.)

*To all whom it may concern:*

Be it known that I, GEORGE SYMONS, a citizen of the United States, residing at Sheridan, in the county of Hamilton and State of Indiana, have invented a new and useful Improvement in Corn-Planters, of which the following is a specification, reference being had to the accompanying drawings.

This invention relates to corn-planters, and has for its object simple devices whereby the furrow is opened, the seed is dropped therein, and covered by the soft dirt. It has for another object to provide means for vertically adjusting the seed-tubes independent of the openers, whereby the seed may be uniformly planted at any suitable depth desired. It has for further objects other improvements, presently more fully described.

The invention consists in certain novel constructions and combinations of parts, as will be more fully described and claimed hereinafter.

Figure 1:
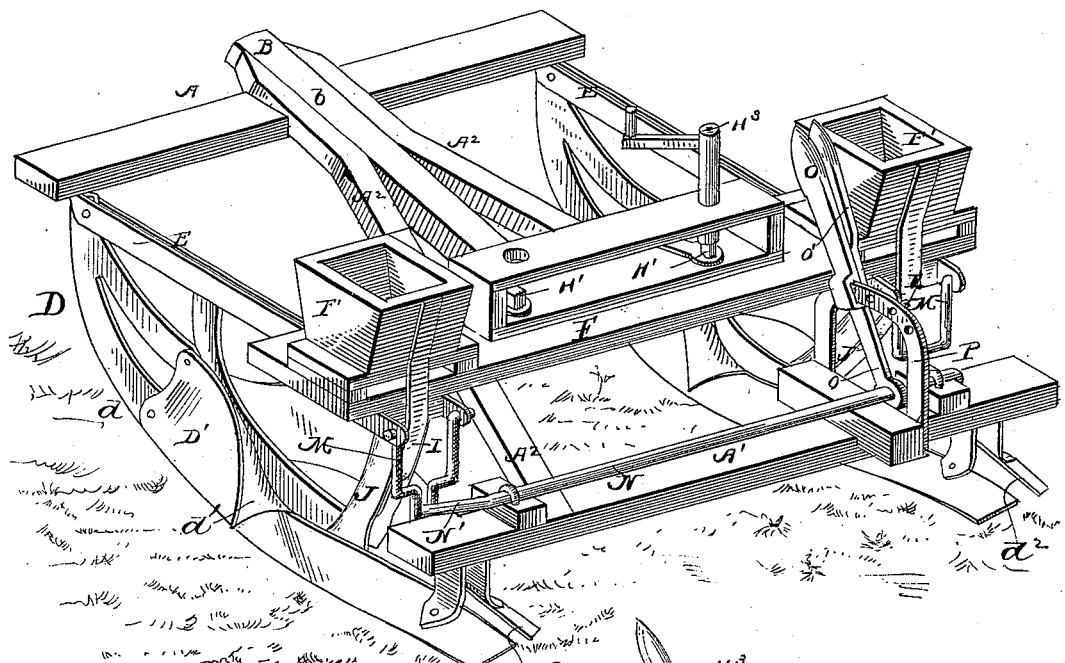
Figure 3:
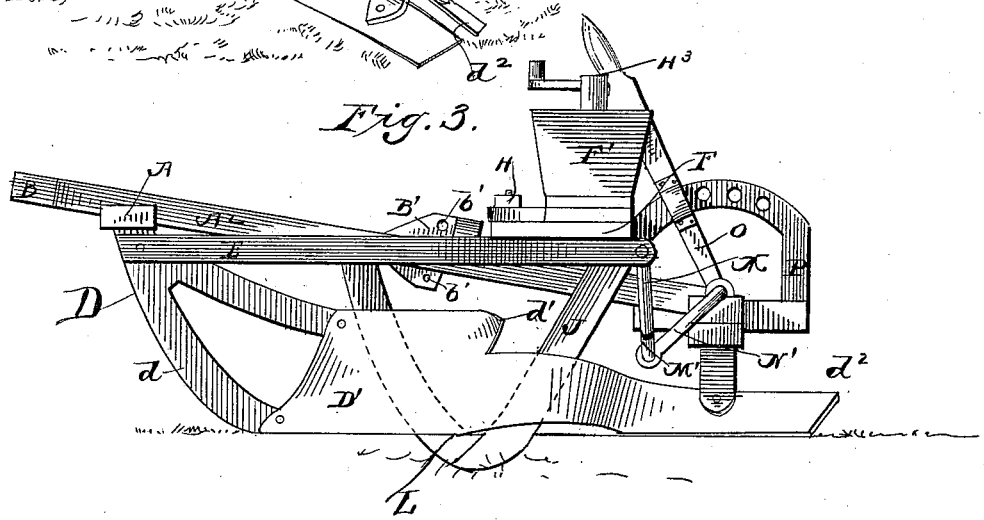

In the accompanying drawings, Figure 1 is a perspective view of my machine, looking at the rear, with the grain-tubes lowered. Fig. 2 is a plan view, and Fig. 3 a side view, of the machine. Fig. 4 is a detail plan view of one of the seed-droppers. Fig. 5 is a detail view in perspective of the lower end of one of the grain-tubes and its cutter detached, illustrating the manner in which the said parts are joined. Fig. 6 is a plan view of seed-box with cover removed, and Fig. 7 is a longitudinal vertical section through the seed-box.

The main frame of my machine is composed of the front bar, A, the rear bar, A', and the braces $A^2 A^2$, having their forward ends secured to the front bar near together, and at the middle portion of said bar, and inclining thence outward and downward to the rear bar, to which they are secured near its ends. These braces strengthen and give firmness to the frame, and serve as a guide and brace for the pole B at the pivotal connection $b$ of such part with the front bar. The pole extends in rear of the pivot $b$, and is provided in its rear end with a plate, B', set vertically edgewise, and provided with a series of vertically-arranged holes, $b'$. A bar, C, of spring metal extends between and is made fast at its opposite ends to the braces $A^2$, close to the rear end of the pole. This spring has an upward and downward tension, and is provided with keepers C', to retain the pin $C^2$, which is adjustable into any one of holes $b'$ in plate B', thus connecting the tongue and spring C. Thus by plate B' the tongue may be set at any desired angle, and at each angle will have a slightly-yielding motion at its rear end, easing the jolts and jars to the horses, and thereby rendering the draft easier, as will be understood. The openers D are secured at their forward ends to the bar A, and at their rear ends to bar A', and are formed with the cutter or edge $d$, from which the plates D' D' extend rearwardly. These plates are preferably of steel, and are bent into the form of mold-boards at $d'$, forming a double mold-board, and throwing the dirt to each side, forming a clear furrow. The base of each of the plates is slightly elevated at the rear of the mold-boards, and the plates are extended thence to the rear, and inclined slightly inward toward their upper edges, forming the coverers $d^2$.

In operation the mold-boards $d'$ will throw the soil to each side, and as the opener is advanced the soft fine dirt will be drawn through the opening or elevation at the juncture of the mold-boards and coverers, and by the latter covered over the planted grain, thus forming a ridge of fine soil over the grain, a shallow furrow on each side of said hill, and the clods, small stones, &c., are thrown up on opposite sides of said furrows. The beams E E are pivotally secured at their forward ends to the cutter $d$ of the openers, and extend rearwardly over the openers and terminate over same at a point slightly in rear of a vertical line with the front ends of coverers $d^2$. A cross-beam, F, connects the rear ends of these beams E, and has the seed-boxes F' mounted on its ends. The bottoms of these boxes are formed with openings $f$, arranged on opposite sides of the center. The dropping-plates G G are journaled below the bottoms of the boxes, and oscillated in a plane parallel thereto and between same and the cross-board F. An opening is formed through the cross-board F, immediately below the bottom of the seed-box, between the openings $f$, and opens into the upper end of the grain-tube. The dropper-plate is provided with seed holes or pockets $g g$, and with a number of bolt-holes, $g'$, through which it may be connected with the operating-bar. As these plates are oscillated their pockets $g$ are alternately registered with the openings $f$ and with the opening leading to the grain-tubes and deliver the grain thereinto. Where desired, these droppers may be provided with different-sized pockets for different grains, which might be brought into play by adjusting the connection with the operating-bar, as will be understood. This bar H extends between and is connected with the droppers by bolts passed through the desired one of holes $g'$. To vibrate this bar, I employ short vertical shafts H', having angular stems to receive a hand-crank, and provided with crank-arms $H^2$, which are connected at their outer ends with the bar H. I prefer to use two of these shafts, one on either side of the middle of the machine, so they may be operated by the hand-crank $H^3$ first by one and then by the other hand of the operator. The crank-arms $H^2$ also each steady the operation of the other one, and render the operation smoother. I provide a bar, $h$, above the shafts H', provided with openings through which the hand-crank is inserted, and by which it is steadied and held to its place. The droppers G are each provided on their rear sides, between the openings $g$, with a cam, G', which extends in operation beyond the rear side of the seed-boxes and actuates spring-plates I. These spring-plates are secured at their upper ends to the seed-boxes, and extend downward in rear of the grain-tubes J, and have their lower ends bent into the seed-tubes, and dividing same into sections when the plates I are in their normal positions. These plates I call "valves," and they are actuated by cams G'. In operation, as the grain is dropped from one of pockets $g$ it is collected in the upper section of the seed-tube against the lower end of the valve, which releases it as the dropper is moved to deposit another hill of corn, thus enabling the corn to be deposited all in one lump, instead of being scattered as they fall. The grain-tube is provided at its lower forward edge with a notch, J', and slightly above the notch with a slot, $J^2$. The grain-tube cutter L has its forward end bolted to the beam and its lower rear edge formed with an upturned hook, L', engaging in slot $J^2$, and with a point or prong, $L^2$, which enters notch J'. The arrangement of hook L' firmly supports the cutter against upward pressure, and its connection with the beams holds it from falling down at its heel. Thus I form a convenient connection, and one which may be easily detached for the purpose of sharpening the cutter or changing same, as may be desired. Bails M M have their arms pivoted to the cross-bar or the beams E E, and depend from such pivots. A shaft, N, is journaled on the bar A' of the framing, and is provided with crank-arms N' N', which extend to and are secured at their extremities on the cross-bars M' of bails M. Thus as the shaft N is rotated the bails, and consequently the seed-boxes, tubes, &c., are raised or lowered. To rotate this shaft N, I provide a lever, O, which extends upward in reach of the driver, and is provided with a hand-pawl, O', which may be easily actuated into and out of engagement with a suitable rack, P, and thus hold the shaft N and the parts operated thereby in any proper position to which they may be adjusted. Thus I am able to regulate the depth at which I deposit the grain by adjusting the grain-dropping devices independent of the supporting mechanism, and by simple, easily-manipulated constructions, as will be understood.

In practice I intend to mount the driver's seat on the main frame, usually on the rear bar, A'.

Having thus described my invention, what I claim, and desire to secure by Letters Patent, is—

1. The combination of the main frame and openers D, with the beams E pivoted at their forward ends to the frame, and connected at their rear ends by a cross-board, F, the seed-dropping mechanism supported on the latter, the bails M, connected to the board, the shaft N, having arms N' connected to the bails, a rack, P, and a lever, O, connected to the shaft N, and provided with a pawl, O', having an actuating-handle, as and for the purpose set forth.

2. In a corn-planter, the combination, with the seed-tube J, provided with notch J' and slot $J^2$, of the cutter L, provided at its rear end with prong $L^2$ and upturned hook L', engaging, respectively, the notch J' and slot $J^2$, substantially as set forth.

3. In a corn-planter, the combination of the main frame, the pivoted tongue B, provided at its rear end with a plate, B', having a vertical series of holes, $b'$, the spring C, secured at its opposite ends to the framing, and yielding vertically up and down at its middle portion, and a pin, $C^2$, connecting the middle portion of spring C and plate B', and adjustable into any one of the holes $b'$, substantially as set forth.

4. In a corn-planter, the opener herein described, consisting of the plates D' D', formed with the mold-boards $d'$ $d'$ and the coverers $d^2$ $d^2$, arranged in rear thereof, the base or lower edge of said plates D' at the juncture of parts $d'$ $d^2$ being slightly raised, substantially as set forth.

5. The combination, in a corn-planter, of the openers D, consisting each of two plates, D', the beams E, the seed-boxes mounted on the rear ends of said beams, the dropping mechanism, the seed-tubes depending from the seed-boxes, with their lower ends held and operating within the openers D, the shaft N, having arms N', the operating-lever, and bails M M, substantially as and for the purposes specified.

In testimony that I claim the foregoing as my own I have hereto affixed my signature in presence of two witnesses.

GEORGE SYMONS.

Witnesses:
GRANVILLE BISHOP,
GEORGE W. LOVELL.